United States Patent
Nabar et al.

(10) Patent No.: US 7,570,210 B1
(45) Date of Patent: Aug. 4, 2009

(54) STEERING MATRIX FEEDBACK FOR BEAMFORMING

(75) Inventors: Rohit Nabar, Sunnyvale, CA (US);
Hui-Ling Lou, Palo Alto, CA (US);
Peter Loc, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 181 days.

(21) Appl. No.: 11/481,142

(22) Filed: Jul. 5, 2006

Related U.S. Application Data

(60) Provisional application No. 60/749,550, filed on Dec. 12, 2005.

(51) Int. Cl.
*H01Q 3/00* (2006.01)
(52) U.S. Cl. .................................................... 342/373
(58) Field of Classification Search ......... 342/367–373, 342/377
See application file for complete search history.

(56) References Cited

U.S. PATENT DOCUMENTS

| | | | |
|---|---|---|---|
| 6,061,023 A * | 5/2000 | Daniel et al. | 342/354 |
| 2004/0087324 A1 * | 5/2004 | Ketchum et al. | 455/513 |
| 2007/0129018 A1 * | 6/2007 | Trainin et al. | 455/69 |

OTHER PUBLICATIONS

Haynes, Toby; "A Primer on Digital Beamforming"; http://www.spectrumsignal.com/ Mar. 28, 1998; 15 pages.
HT PHY Specification; Enhanced Wireless Consortium publication; V1.27; Dec. 23, 2005; 67 pages.
HT MAC Specification; Enhanced Wireless Consortium publication; V1.24; 2005; 100 pages.

* cited by examiner

*Primary Examiner*—Thomas H Tarcza
*Assistant Examiner*—Nga X Nguyen

(57) ABSTRACT

A network device includes a calibration module that receives a first channel state information (CSI) matrix from a link partner, that determines CSI based on radio frequency (RF) signals transmitted from the link partner, and that generates a second CSI matrix that includes the CSI for the RF signals. The network device includes a first steering module that determines a first steering matrix based on the first CSI matrix, a control module that adjusts beamforming weights based on the first steering matrix, and a second steering module that determines a second steering matrix based on the second CSI matrix and that transmits the second steering matrix to the link partner.

41 Claims, 11 Drawing Sheets

STEERING MATRIX FEEDBACK FOR BEAMFORMING

CROSS-REFERENCE TO RELATED APPLICATIONS

This application claims the benefit of U.S. Provisional Application No. 60/749,550, filed on Dec. 12, 2005. The disclosure of the above application is incorporated herein by reference in its entirety.

FIELD

The present disclosure relates to wireless network devices, and more particularly to directing radio frequency signals toward a particular target.

BACKGROUND

IEEE defined several different standards for configuring wireless networks and devices. The wireless network devices may be operated in either an infrastructure mode or an ad-hoc mode. In the infrastructure mode, the wireless network devices or client stations communicate with each other through an access point. In the ad-hoc mode, the wireless network devices communicate directly with each other and do not employ an access point. The term client station or mobile station may not necessarily mean that a wireless network device is actually mobile. For example, a desktop computer that is not mobile may incorporate a wireless network device and operate as a mobile station or client station. A wireless network that operates in the infrastructure mode includes an access point (AP) and at least one client station that communicates with the AP.

Referring now to FIG. 1, a first wireless network 10 is illustrated in an infrastructure mode. The first wireless network 10 includes one or more client stations 12 and one or more access points (AP) 14. The client station 12 and the AP 14 transmit and receive wireless signals 16. The AP 14 is a node in a network 18. The network 18 may be a local area network (LAN), a wide area network (WAN), or another network configuration. The network 18 may include other nodes such as a server 20 and may be connected to a distributed communications system 22 such as the Internet.

Referring now to FIG. 2, a second wireless network 24 operates in an ad-hoc mode. The second wireless network 24 includes multiple client stations 26-1, 26-2, and 26-3 that transmit and receive wireless signals 28. The client stations 26-1, 26-2, and 26-3 collectively form a LAN and communicate directly with each other.

To improve range, signal quality, and bandwidth, some wireless network devices may employ multiple transmit and receive antennas. The network devices may steer signals launched from an array of antennas to improve performance.

SUMMARY

A network device comprises a calibration module that receives a first channel state information (CSI) matrix from a link partner, that determines CSI based on radio frequency (RF) signals transmitted from the link partner, and that generates a second CSI matrix that includes the CSI for the RF signals. The network device comprises a first steering module that determines a first steering matrix based on the first CSI matrix, a control module that adjusts beamforming weights based on the first steering matrix, and a second steering module that determines a second steering matrix based on the second CSI matrix and that transmits the second steering matrix to the link partner.

In another feature, the beamforming weights are adjusted to direct RF signals toward the link partner.

In another feature, the calibration module transmits a set of training signals to the link partner. The first CSI matrix is based on the training signals. At least one of the training signals includes a frame that indicates whether the network device is capable of generating the second steering matrix.

In another feature, at least one of the RF signals includes a frame that indicates whether the link partner is capable of directing the RF signals toward the network device based on the second steering matrix.

In another feature, the network device of claim 1 further comprises a set of RF transceivers that transmit and receive RF signals and a beamforming module that directs the RF transceivers to transmit toward the link partner based on the first steering matrix.

In another feature, an access point (AP) comprises the network device.

In another feature, a wireless network comprises the network device and further comprises the link partner, wherein the link partner comprises a set of RF transceivers that transmit and receive RF signals, and a beamforming module that directs the RF transceivers to transmit toward the network device based on the second steering matrix.

In another feature, a wireless network comprises the AP and further comprises the link partner, wherein the link partner comprises a set of RF transceivers that transmit and receive RF signals and a beamforming module that directs the RF transceivers to transmit toward the network device based on the second steering matrix.

In another feature, the link partner further comprises a secondary calibration module that generates the first CSI matrix. The link partner further comprises a secondary steering module that generates a secondary steering matrix based on the CSI and a secondary control module that directs the beamforming module to adjust beamforming weights, wherein the beamforming weights direct the RF signals toward the network device.

In still other features, a network device comprises a calibration module that determines channel state information (CSI) based on radio frequency (RF) signals transmitted from a link partner, that generates a CSI matrix that includes the CSI for the RF signals, that transmits the CSI matrix to the link partner, and that receives a steering matrix from the link partner. The network device comprises a control module that adjusts beamforming weights based on the steering matrix.

In another feature, the calibration module transmits a set of training signals to the link partner. The steering matrix is based on the training signals. At least one of the training signals includes a frame that indicates whether the network device is capable of adjusting the beamforming weights based on the steering matrix.

In another feature, at least one of the RF signals includes a frame that indicates whether the link partner is capable of generating the steering matrix.

In another feature, the network device further comprises a set of RF transceivers that transmit and receive RF signals and a beamforming module that directs the RF signals toward the link partner.

In another feature, a wireless network comprises the network device and further comprises a link partner, wherein the link partner comprises a set of RF transceivers that transmit and receive RF signals and a beamforming module that directs the RF transceivers to transmit toward the network device based on the CSI matrix.

In another feature, the link partner includes an access point.

In another feature, the link partner further comprises a second calibration module that receives the CSI matrix, that determines a second CSI based on the RF signals, and that generates a second CSI matrix that includes the second CSI for each of the RF signals. The link partner further comprises a first steering module that determines the steering matrix based on the second CSI matrix, a second steering module that determines a second steering matrix based on the CSI matrix, and a second control module that adjusts a second set of beamforming weights based on the second steering matrix, wherein the RF signals are directed toward the network device when the second set of weights are adjusted.

In another feature, the network device further comprises a steering module that generates a second steering matrix based on a second CSI matrix received from the link partner.

In still other features, a method comprises receiving a first channel state information (CSI) matrix from a link partner, determining CSI based on radio frequency (RF) signals transmitted from the link partner, generating a second CSI matrix that includes the CSI for the RF signals, determining a first steering matrix based on the first CSI matrix, adjusting beamforming weights based on the first steering matrix, determining a second steering matrix based on the second CSI matrix, and transmitting the second steering matrix to the link partner.

In another feature, the method further comprises adjusting the beamforming weights to direct RF signals toward the link partner.

In another feature, the method further comprises transmitting a set of training signals to the link partner. The method further comprises generating the first CSI matrix based on the training signals. The method further comprises including a frame in at least one of the training signals to indicate ability to generate the second steering matrix.

In another feature, the method further comprises including a frame in at least one of the RF signals to indicate whether the link partner can direct the RF signals based on the second steering matrix.

In another feature, the method further comprises transmitting and receiving RF signals and directing transmission and reception of the RF signals toward the link partner based on the first steering matrix.

In another feature, the method further comprises transmitting and receiving RF signals at the link partner and directing transmission and reception of the RF signals at the link partner based on the second steering matrix.

In another feature, the method further comprises generating the first CSI matrix.

In another feature, the method further comprising generating a secondary steering matrix based on the CSI and adjusting beamforming weights, wherein the beamforming weights direct the RF signals.

In still other features, a method comprises determining channel state information (CSI) based on radio frequency (RF) signals transmitted from a link partner, generating a CSI matrix that includes the CSI for the RF signals, transmitting the CSI matrix to the link partner, receiving a steering matrix from the link partner, and adjusting beamforming weights based on the steering matrix.

In another feature, the method further comprises transmitting a set of training signals to the link partner. The method further comprises generating the steering matrix based on the training signals. The method further comprises including a frame in at least one of the training signals to indicate ability to adjust beamforming weights based on the steering matrix.

In another feature, the method further comprises including a frame in at least one of the RF signals to indicate whether the link partner can generate the steering matrix.

In another feature, the method further comprises that transmitting and receiving RF signals and directing transmission and reception of the RF signals toward the link partner.

In another feature, the method further comprises transmitting and receiving RF signals at the link partner and directing transmission and reception of the RF signals at the link partner based on the CSI matrix.

In another feature, the method further comprises receiving the CSI matrix, determining a second CSI based on the RF signals, generating a second CSI matrix that includes the second CSI for each of the RF signals, determining the steering matrix based on the second CSI matrix, determining a second steering matrix based on the CSI matrix, adjusting a second set of beamforming weights based on the second steering matrix, and directing the RF signals when the second set of weights are adjusted.

In another feature, the method further comprises generating a second steering matrix based on a second CSI matrix received from the link partner.

In still other features, a network device comprises calibration means for receiving a first channel state information (CSI) matrix from a link partner, determining CSI based on radio frequency (RF) signals transmitted from the link partner, and generating a second CSI matrix that includes the CSI for the RF signals. The network device further comprises first steering means for determining a first steering matrix based on the first CSI matrix, control means for adjusting beamforming weights based on the first steering matrix, and second steering means for determining a second steering matrix based on the second CSI matrix and that transmits the second steering matrix to the link partner.

In another feature, the beamforming weights are adjusted to direct RF signals toward the link partner.

In another feature, the calibration means transmits a set of training signals to the link partner. The first CSI matrix is based on the training signals. At least one of the training signals includes a frame that indicates whether the network device is capable of generating the second steering matrix.

In another feature, at least one of the RF signals includes a frame that indicates whether the link partner is capable of directing the RF signals toward the network device based on the second steering matrix.

In another feature, the network device further comprises RF transceiver means for transmitting and receiving RF signals and beamforming means for directing the RF transceiver means to transmit toward the link partner based on the first steering matrix.

In another feature, an access point (AP) comprises the network device.

In another feature, a wireless network comprises the network device and further comprises the link partner, wherein the link partner comprises RF transceiver means for transmitting and receiving RF signals and beamforming means for directing the RF transceiver means to transmit toward the network device based on the second steering matrix.

In another feature, a wireless network comprises the AP and further comprises the link partner, wherein the link partner comprises RF transceiver means for transmitting and receiving RF signals and beamforming means for directing the RF transceiver means to transmit toward the network device based on the second steering matrix.

In another feature, the link partner further comprises secondary calibration means for generating the first CSI matrix.

In another feature, the link partner further comprises secondary steering means for generating a secondary steering matrix based on the CSI and secondary control means for directing the beamforming means to adjust beamforming weights, wherein the beamforming weights direct the RF signals toward the network device.

In still other features, a network device comprises calibration means for determining channel state information (CSI) based on radio frequency (RF) signals transmitted from a link partner, generating a CSI matrix that includes the CSI for the RF signals, transmitting the CSI matrix to the link partner, and receiving a steering matrix from the link partner. The network device further comprises control means for adjusting beamforming weights based on the steering matrix.

In another feature, the calibration means transmits a set of training signals to the link partner.

In another feature, the steering matrix is based on the training signals. At least one of the training signals includes a frame that indicates whether the network device is capable of adjusting the beamforming weights based on the steering matrix.

In another feature, at least one of the RF signals includes a frame that indicates whether the link partner is capable of generating the steering matrix.

In another feature, the network device further comprises RF transceiver means for transmitting and receiving RF signals and beamforming means for directing the RF signals toward the link partner.

In another feature, a wireless network comprises the network device and further comprises a link partner, wherein the link partner comprises RF transceiver means for transmitting and receiving RF signals and beamforming means for directing the RF transceiver means to transmit toward the network device based on the CSI matrix.

In another feature, the link partner includes an access point.

In another feature, the link partner further comprises second calibration means for receiving the CSI matrix, determining a second CSI based on the RF signals, and generating a second CSI matrix that includes the second CSI for each of the RF signals. The link partner further comprises first steering means for determining the steering matrix based on the second CSI matrix, second steering means for determining a second steering matrix based on the CSI matrix, and second control means for adjusting a second set of beamforming weights based on the second steering matrix, wherein the RF signals are directed toward the network device when the second set of weights are adjusted.

In another feature, the network device further comprises a steering means for generating a second steering matrix based on a second CSI matrix received from the link partner.

In still other features, a computer program executed by a processor comprises receiving a first channel state information (CSI) matrix from a link partner, determining CSI based on radio frequency (RF) signals transmitted from the link partner, generating a second CSI matrix that includes the CSI for the RF signals, determining a first steering matrix based on the first CSI matrix, adjusting beamforming weights based on the first steering matrix, determining a second steering matrix based on the second CSI matrix, and transmitting the second steering matrix to the link partner.

In another feature, the computer program further comprises adjusting the beamforming weights to direct RF signals toward the link partner.

In another feature, the computer program further comprises transmitting a set of training signals to the link partner. The computer program further comprises generating the first CSI matrix based on the training signals. The computer program further comprises including a frame in at least one of the training signals to indicate ability to generate the second steering matrix.

In another feature, the computer program further comprises including a frame in at least one of the RF signals to indicate whether the link partner can direct the RF signals based on the second steering matrix.

In another feature, the computer program further comprises transmitting and receiving RF signals and directing transmission and reception of the RF signals toward the link partner based on the first steering matrix.

In another feature, the computer program further comprises transmitting and receiving RF signals at the link partner and directing transmission and reception of the RF signals at the link partner based on the second steering matrix.

In another feature, the computer program further comprises generating the first CSI matrix.

In another feature, In another feature, the computer program further comprising generating a secondary steering matrix based on the CSI and adjusting beamforming weights, wherein the beamforming weights direct the RF signals.

In still other features, a computer program executed by a processor comprises determining channel state information (CSI) based on radio frequency (RF) signals transmitted from a link partner, generating a CSI matrix that includes the CSI for the RF signals, transmitting the CSI matrix to the link partner, receiving a steering matrix from the link partner, and adjusting beamforming weights based on the steering matrix.

In another feature, the computer program further comprises transmitting a set of training signals to the link partner. The computer program further comprises generating the steering matrix based on the training signals. The computer program further comprises including a frame in at least one of the training signals to indicate ability to adjust beamforming weights based on the steering matrix.

In another feature, the computer program further comprises including a frame in at least one of the RF signals to indicate whether the link partner can generate the steering matrix.

In another feature, the computer program further comprises that transmitting and receiving RF signals and directing transmission and reception of the RF signals toward the link partner.

In another feature, the computer program further comprises transmitting and receiving RF signals at the link partner and directing transmission and reception of the RF signals at the link partner based on the CSI matrix.

In another feature, the computer program further comprises receiving the CSI matrix, determining a second CSI based on the RF signals, generating a second CSI matrix that includes the second CSI for each of the RF signals, determining the steering matrix based on the second CSI matrix, determining a second steering matrix based on the CSI matrix, adjusting a second set of beamforming weights based on the second steering matrix, and directing the RF signals when the second set of weights are adjusted.

In another feature, the computer program further comprises generating a second steering matrix based on a second CSI matrix received from the link partner.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
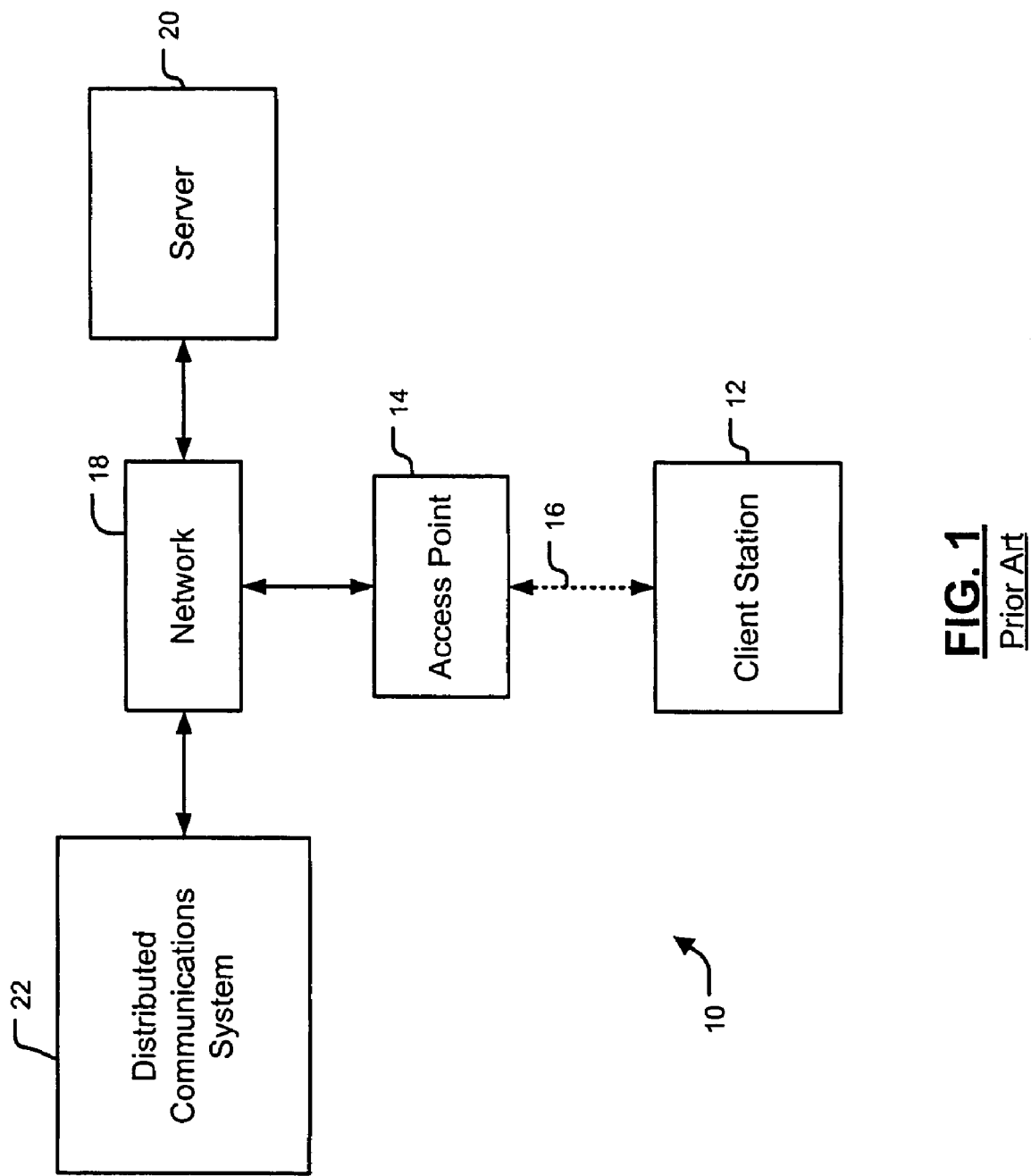
FIG. 1 is functional block diagram of a wireless network operating in an infrastructure mode.
Figure 2:
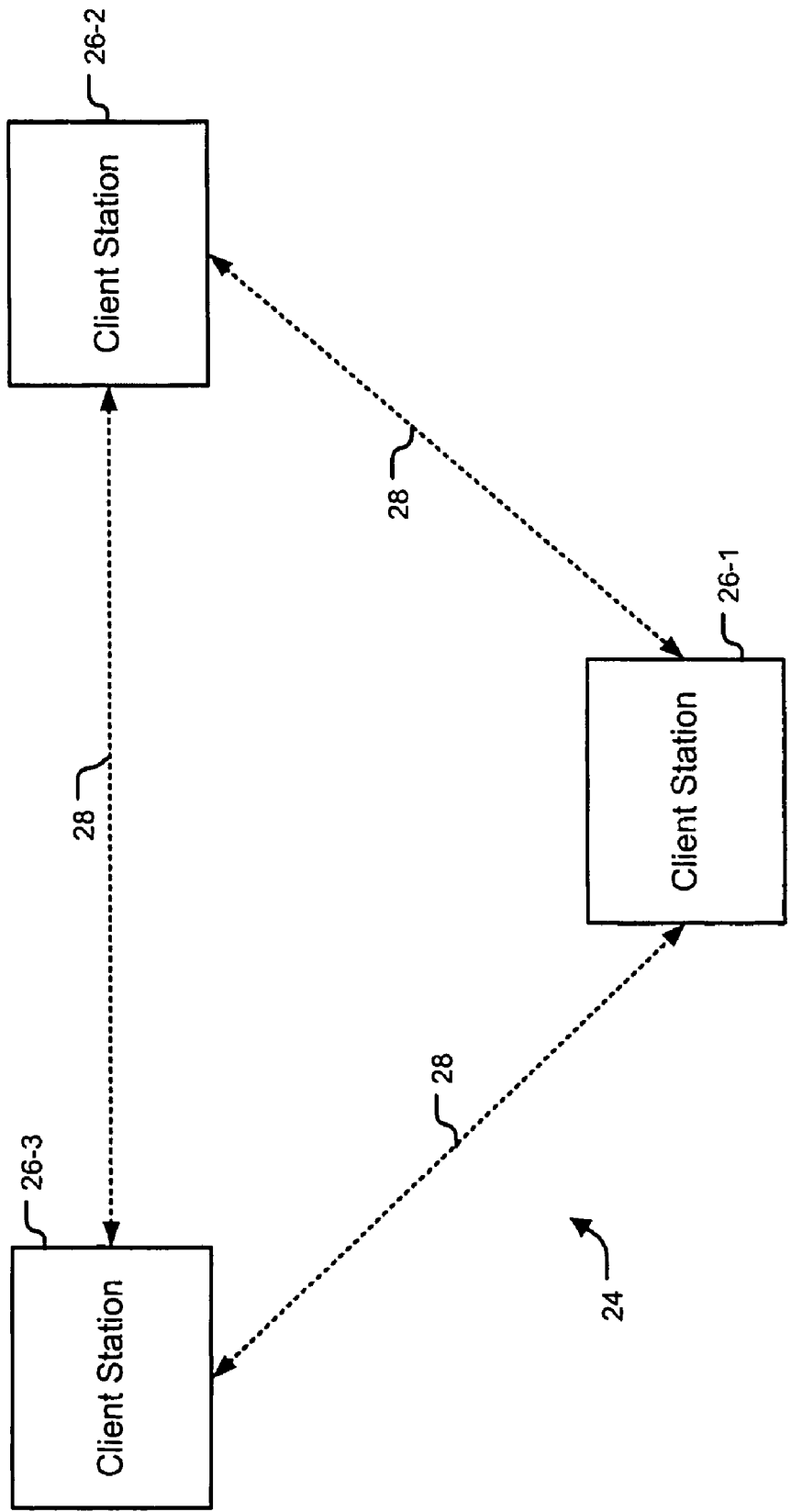
FIG. 2 is a function block diagram of a wireless network operating in an ad-hoc mode.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 3:
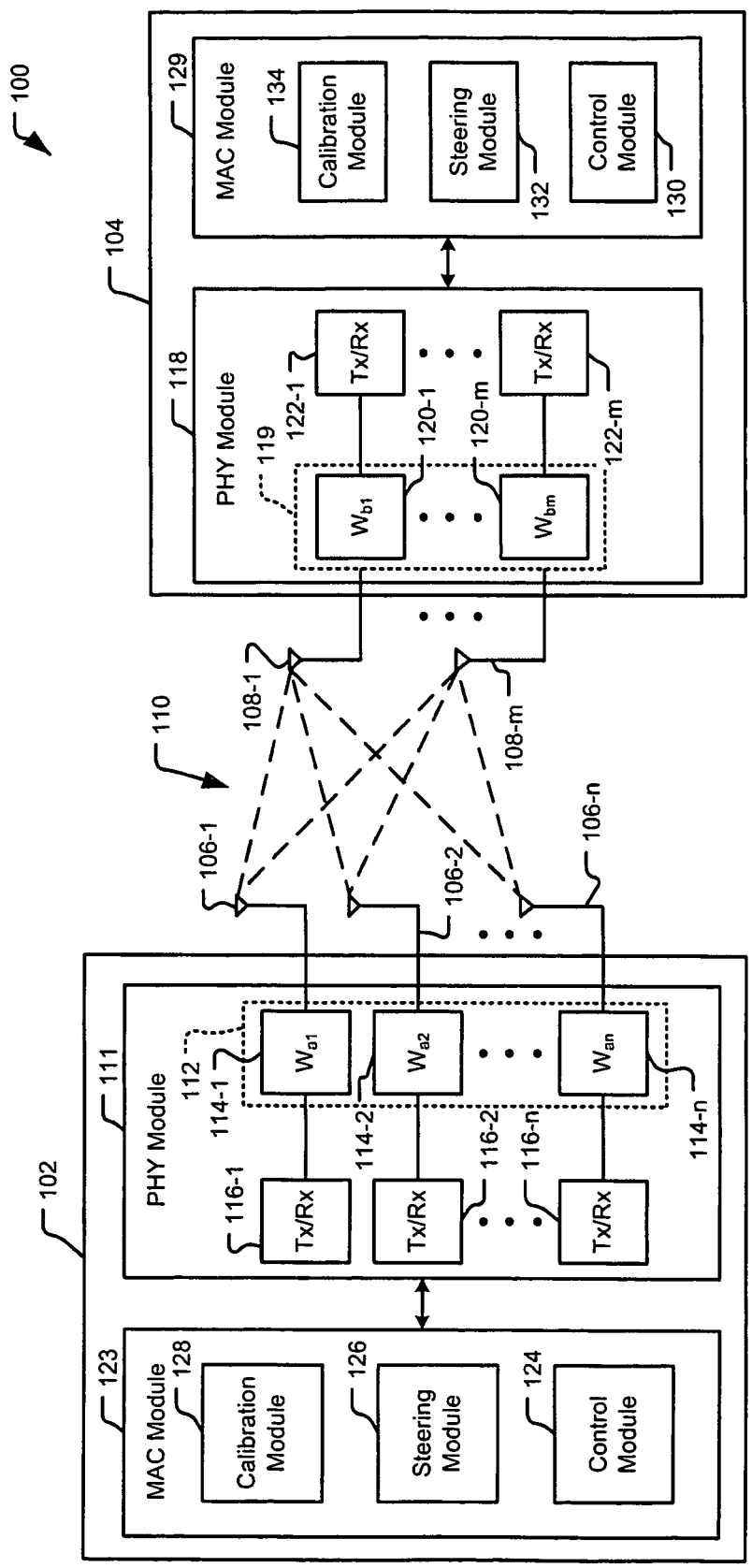
FIG. 3 is a functional block diagram of an exemplary multiple input multiple output (MIMO) wireless network.

Referring now to FIG. 3, an exemplary multiple input multiple output (MIMO) network as described in IEEE 802.11(n) draft specification (as proposed in Enhanced Wireless Consortium, HT PHY Specification v1.28, Jan. 2, 2006 and Enhanced Wireless Consortium, HT MAC Specification v1.28, Dec. 23, 2005), which is incorporated by reference in its entirety, is depicted at 100. A first device 102, such as an access point (AP) or a client station, may communicate with a second device 104, such as an AP or client station. When the first and second devices 102, 104 communicate with each other they may be generally referred to as link partners.

The first and second devices 102 and 104 include physical layer (PHY) modules 111 and 118 and media access control (MAC) modules 123 and 129, respectively. The first device 102 device may include a first set of antennas 106-1, 106-2, . . . , and 106-n and the second device 104 may include a second set of antennas 108-1, . . . , and 108-m. The first device 102 may parse a single frame into multiple spatial streams and then simultaneously transmit multiple RF signals 110 to the second device 104. The second device 104 may receive the multiple RF signals 110 and reassemble them into a single frame. Similarly, the second device 104 may simultaneously transmit multiple RF signals 110 to the first device 102, which may reassemble them into a single frame.

To increase transmission rates, the first 102 and second device 104 may utilize beamforming. Beamforming is a method to increase channel capacity, and consequently transmission rates, by increasing signal to noise ratio (SNR) of an RF signal. Beamforming combines RF signals from a set of small non-directional antennas to simulate a directional antenna. The combined RF signals can be pointed (or steered) in a particular direction to increase signal strength, which increases SNR. When receiving a signal, beamforming can increase RF signal gain in the direction of wanted signals and decrease the gain for non-intended users. When transmitting a signal, beamforming can increase the gain in the direction that the signal is to be sent, which may be accomplished by creating beams and nulls in the radiation pattern.

The PHY module 111 includes a beamforming module 112 with a first set of adjustable weights 114-1, 114-2, . . . , and 114-n. Each weight 114-1, 114-2, . . . , and 114-n may be adjusted to manipulate signals received from a respective transceiver 116-1, 116-2, . . . , and 116-n to collectively steer signals launched from the antennas 106 in a particular direction. The weights 114-1, 114-2, . . . , and 114-n are typically complex weights that include an amplitude and a phase shift portion. However, other weight configurations may be possible.

Similarly, the PHY module 118 includes a beamforming module 119 with a second set of adjustable weights 120-1, . . . , and 120-m. Each weight 120-1, . . . , and 120-m may be adjusted to manipulate signals received from a respective transceiver 122-1, . . . , and 122-m to collectively steer signals launched from the antennas 108 in a particular direction. The weights 120-1, . . . , and 120-n are typically complex weights that include an amplitude and a phase shift portion, however other weight configurations may be possible. To adjust the weights 114 and 120, the first and second devices 102, 104 may use channel state information (CSI) feedback. The CSI feedback may include a signal to noise ratio for each RF signal 110.

The MAC module 123 includes a control module 124, a steering module 126, and a calibration module 128. The control module 124, steering module 126, and calibration module 128 may be implemented individually and/or combined into one or more modules. The MAC module 123 may communicate with the PHY module 111. In some embodiments, the calibration module 128 may communicate with RF transceivers 116, the steering module 126 may communicate with the calibration module 128 and the control module 124, and the control module 124 may communicate with the beamforming module 112.

The MAC module 129 includes a second control module 130, a second steering module 132, and a second calibration module 134. The MAC module 129 may communicate with the PHY module 118. In some embodiments, the second calibration module 134 may communicate with RF transceivers 122, the second steering module 132 may communicate with the second calibration module 134 and the second control module 130, and the second control module 130 may communicate with the beamforming module 119.

The first device 102 may obtain CSI from the second device 104 and adjust the weights 114 based thereon. More specifically, the calibration module 128 may generate and transmit a set of training signals to the second device 104. The second calibration module 134 may determine CSI of the training signals and then transmit a CSI matrix that includes CSI for each training signal to the first device 102. When the first device 102 receives the CSI matrix, the steering module 126 may generate a steering matrix based on the CSI matrix. The control module 124 may adjust the weights 114 based on the steering matrix to direct the RF signals 110 toward the second device 104.

In a similar manner, the second device 104 may obtain CSI from the first device 102 and adjust the second set of weights 120 based thereon. More specifically, the second calibration module 134 may generate and transmit a set of training signals to the first device 102. The calibration module 128 of the first device 102 may determine CSI of the training signals and then transmit a CSI matrix that includes CSI for each training signal to the second device 104. When the second device 104 receives the CSI matrix, the second steering module 132 may generate a steering matrix based on the CSI matrix. The second control module 130 may adjust the second set of weights 120 based on the steering matrix to direct the RF signals 110 toward the first device 102.

Figure 4:
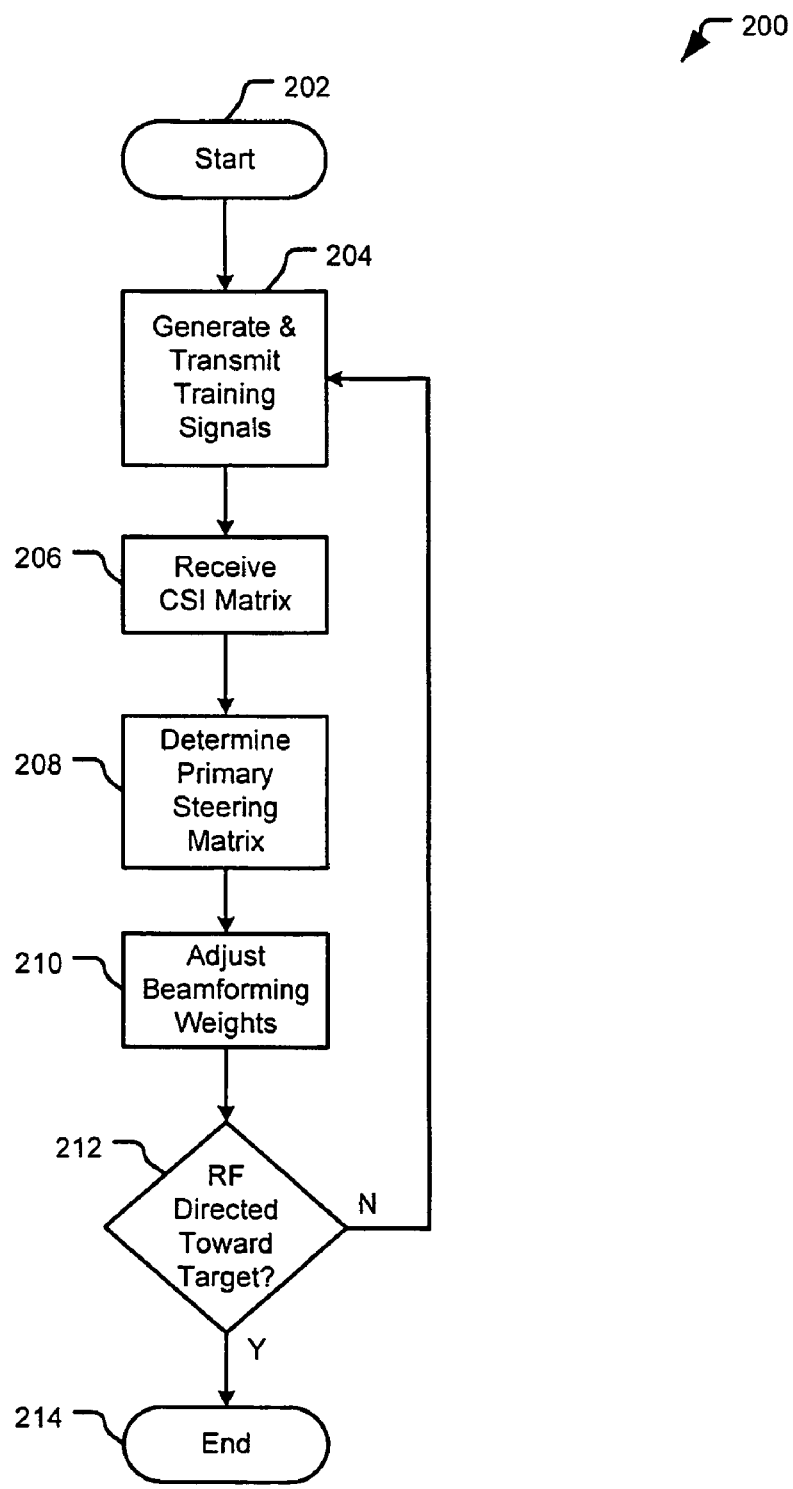
FIG. 4 is a flowchart illustrating exemplary steps that may be implemented to adjust beamforming weights associated with a network device.

Referring now to FIG. 4, exemplary steps that may be implemented to adjust the first set of weights 114 are generally depicted at 200. The process starts in step 202 when the first device 102 has data to transmit to the second device 104. In step 204, the calibration module 128 may generate and transmit training signals to the second device 104. In step 206, the calibration module 128 may receive a CSI matrix from the second device 104. The steering module 126 may determine a steering matrix based on the CSI matrix in step 208. Once the steering matrix has been determined, the control module 124 may adjust the first set of weights 114 based on the steering matrix in step 210.

In step 212, the calibration module 128 may determine whether the RF signals 110 are directed toward the second device 104. To determine whether the RF signals 110 are directed toward the second device 104, the calibration module 128 may send a second set of training signals and receive a second CSI matrix based thereon. If the RF signals 110 are directed toward the second device 104, the process ends in step 214. However, if the RF signals 110 are not directed toward the target device, the process may return to step 204. Although the first set of weights 114 are adjusted in this example, skilled artisans will recognize that the second set of weights 120 may be adjusted in a similar manner.

Figure 5:
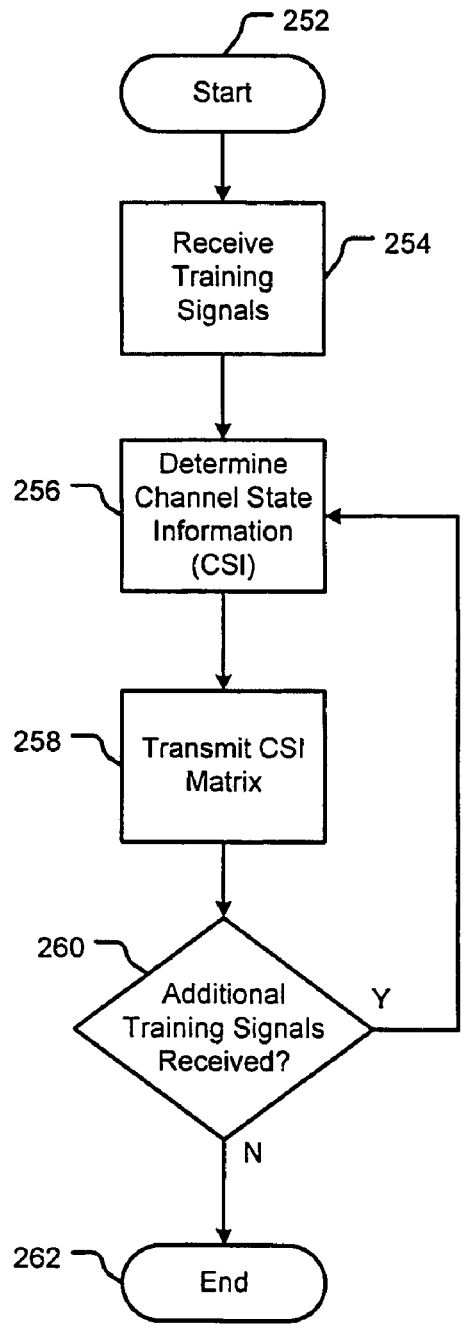
FIG. 5 is a flowchart illustrating exemplary steps that may be implemented to provide channel state information (CSI) feedback to the network device.

Referring now to FIG. 5, exemplary steps taken to provide CSI feedback are generally depicted at 250. The process begins in step 252 when the first device 102 has data to transmit to the second device 104. In step 254, the second calibration module 134 may receive training signals from the first device 102. In step 256, CSI of the training signals may be determined and a CSI matrix may be generated based thereon. In step 258, the second calibration module 134 may transmit the CSI matrix to the first device 102. The second calibration module 134 may determine if additional training signals are received from the first device 102 in step 260. If the second device 104 does not receive additional training signals, the process may end in step 262. If the second device 104 does receive additional training signals, the process may return to step 256. Although the second device 104 is providing CSI feedback to the first device 102, skilled artisans will recognize that the first device 102 may provide feedback to the second device 104 in a similar manner.

Figure 6:
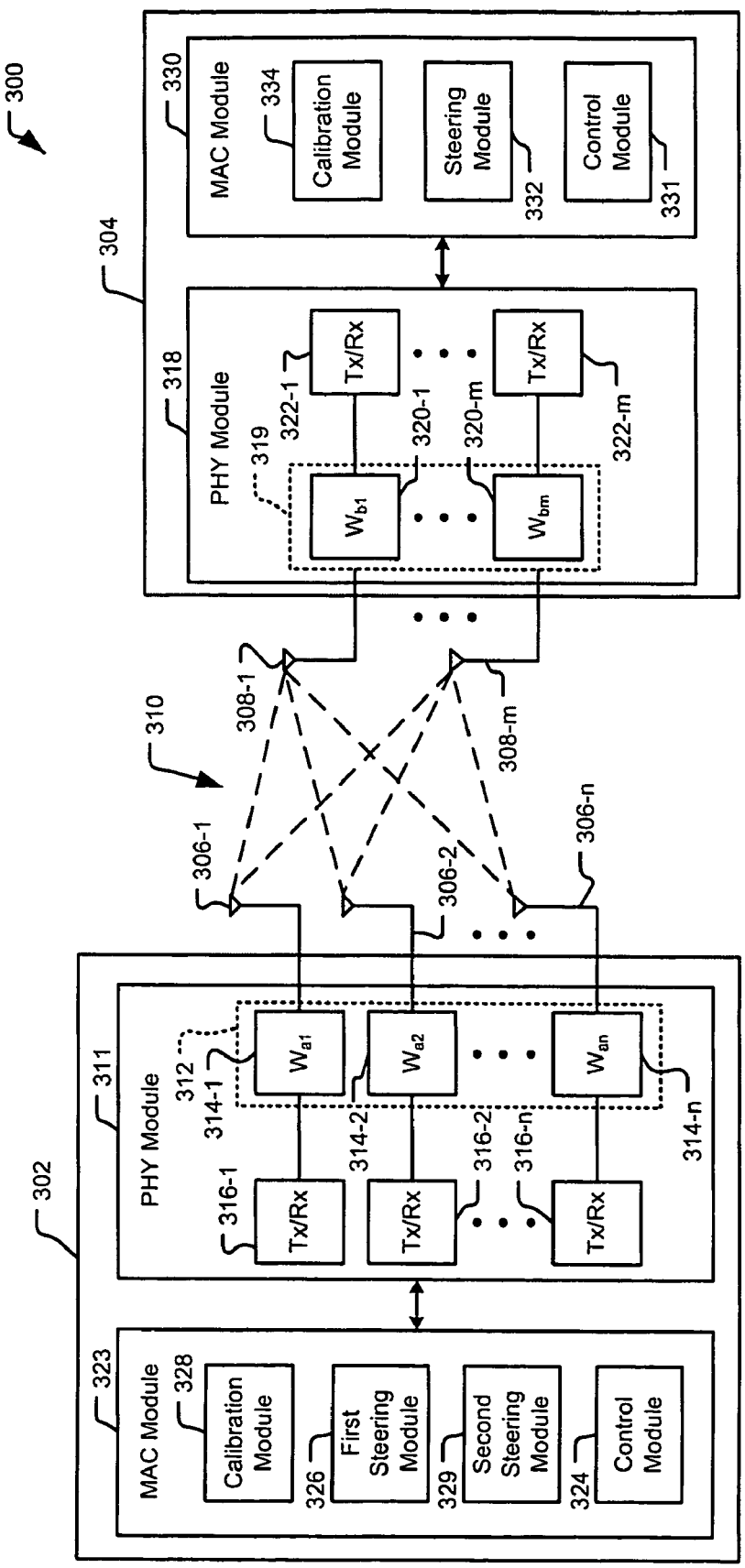
FIG. 6 is a functional block diagram of an exemplary multiple input multiple output (MIMO) wireless network that has primary and secondary network devices.

Referring now to FIG. 6, some MIMO networks 300 may be configured to have a primary device 302, such as an AP or a master client station, and a secondary device 304, such as a client station or a slave client station that communicate with each other as link partners. The primary device 302 may capable of processing more data than the secondary device 304. Therefore, the primary device 302 may determine a steering matrix for the secondary device 304 when the devices 302, 304 are compatible. The devices 302, 304 are compatible when the primary device 302 is capable of determining a steering matrix for the secondary device 304, and the secondary device 304 is capable of adjusting the weights 120 based on the steering matrix. Since the secondary device 304 does not have to determine a steering matrix, the secondary device 304 may consume less power, which is advantageous for battery powered devices.

The primary device 302 device may include a set of primary antennas 306-1, 306-2, . . . , and 306-*n* and the secondary device 304 may include a set of secondary antennas 308-1, . . . , and 308-*m*. The primary device 302 may parse a single frame into multiple spatial streams and then simultaneously transmit multiple RF signals 310 to the secondary device 304. The secondary device 304 may receive the multiple RF signals 310 and reassemble them into a single frame. Similarly, the secondary device 304 may simultaneously transmit multiple RF signals 310 to the primary device 302, which may then receive and reassemble the RF signals 310 into a single frame.

The primary device 302 may include a PHY module 311 that includes a primary beamforming module 312 with an adjustable set of primary weights 314-1, 314-2, . . . , and 314-*n*. Each primary weight 314-1, 314-2, . . . , and 314-*n* may be adjusted to manipulate signals received from a respective primary transceiver 316-1, 316-2, . . . , and 316-*n* to collectively steer signals launched from the primary antennas 306 in a particular direction. The primary weights 314-1, 314-2, . . . , and 314-*n* are typically complex weights that include an amplitude and a phase shift portion, however other weight configurations may be possible.

Similarly, the secondary device 304 may include a PHY module 318 that includes a secondary beamforming module 319 with an adjustable set of secondary weights 320-1, . . . , and 320-*m*. Each secondary weight 320-1, . . . , and 320-*m* may be adjusted to manipulate signals received from a respective secondary transceiver 322-1, . . . , and 322-*m* to collectively steer signals launched from the secondary antennas 308 in a particular direction. The secondary weights 320-1, . . . , and 320-*n* are typically complex weights that include an amplitude and a phase shift portion, however other weight configurations may be possible. To adjust the primary and secondary weights 114 and 120, the primary and secondary devices 302, 304 may use channel state information (CSI) feedback. The CSI feedback may include a signal to noise ratio for each RF signal 310.

The primary device 302 may include a MAC module 323 that includes a primary control module 324, a first steering module 326, a primary calibration module 328, and a second steering module 329. The MAC module 323 may communicate with the PHY module 311. In some embodiments, the primary calibration module 328 may communicate with the RF transceivers 316 and the second steering module 329, the first steering module 396 may communicate with the primary calibration module 328 and the primary control module 324, and the primary control module 324 may communicate with the primary beamforming module 312.

The secondary device 304 may include a MAC module 330 that may include a secondary control module 331, a secondary steering module 332, and a secondary calibration module 334. The MAC module 330 may communicate with the PHY module 318. In some embodiments, the secondary calibration module 334 may communicate with the RF transceivers 322 and the secondary control module 331, the secondary steering module 332 may communicate with the secondary calibration module 334 and the secondary control module 331, and the secondary control module 331 may communicate with the secondary beamforming module 319.

The primary device 302 may obtain CSI from the secondary device 304 and adjust the primary weights 314 based thereon. More specifically, the primary calibration module 328 may generate and transmit a set of training signals to the second device 304. The training signals may include a management action frame that indicates whether the primary device 302 is capable of determining a steering matrix for the secondary device 304 based on a CSI matrix. In some embodiments, the secondary device 304 may not be capable of determining a steering matrix based on a CSI matrix when in a power save mode. In other embodiments, the secondary device 304 may not include the secondary steering module 332 and therefore would not be capable of determining a steering matrix based on a CSI matrix.

The calibration module 334 may determine CSI of the training signals and then transmit a CSI matrix that includes CSI for each training signal to the primary device 302. When the primary device 302 receives the CSI matrix, the first steering module 326 may generate a steering matrix based on the CSI matrix. The primary control module 324 may adjust the primary weights 314 based on the steering matrix to direct the RF signals 110 toward the secondary device 304.

The secondary device 304 may obtain data from the primary device 302 and adjust the secondary weights 320 based thereon. More specifically, the secondary calibration module 334 may generate and transmit a set of training signals to the first device 102. The training signals may include a management action frame that indicates whether the secondary device 304 is capable of adjusting the secondary weights 320 based on a steering matrix received from the primary device 302. As previously mentioned, in some embodiments the secondary device may not be capable of determining a steering matrix based on a CSI matrix when in a power save mode. In other embodiments, the secondary device 304 may not include the secondary steering module 332 and therefore would not be capable of determining a steering matrix based on a CSI matrix.

If the secondary device 304 is not capable of adjusting the weights 320 based on a steering matrix received from the primary device 302, the primary calibration module 328 may determine CSI of the training signals and then transmit a CSI matrix that includes CSI for each training signal to the secondary device 304. When the secondary device 304 receives the CSI matrix, the secondary steering module 332 may generate a steering matrix based on the CSI matrix. The secondary control module 331 may adjust the secondary weights 320 based on the steering matrix to direct the RF signals 310 toward the primary device 302.

However, if the secondary device 304 is capable of adjusting the weights 320 based on a steering matrix received from the primary device 302, the primary calibration module 328 may determine CSI of the training signals. The second steering module 329 of the primary device 302 may then determine a steering matrix for the secondary device 304 based on the CSI matrix. The primary calibration module 328 may then transmit the steering matrix determined by the second steering module 329 to the secondary device 304. When the secondary device 304 receives the steering matrix, the secondary control module 331 may adjust the secondary weights 320 based on the received steering matrix to direct the RF signals 310 toward the primary device 302.

Figure 7:
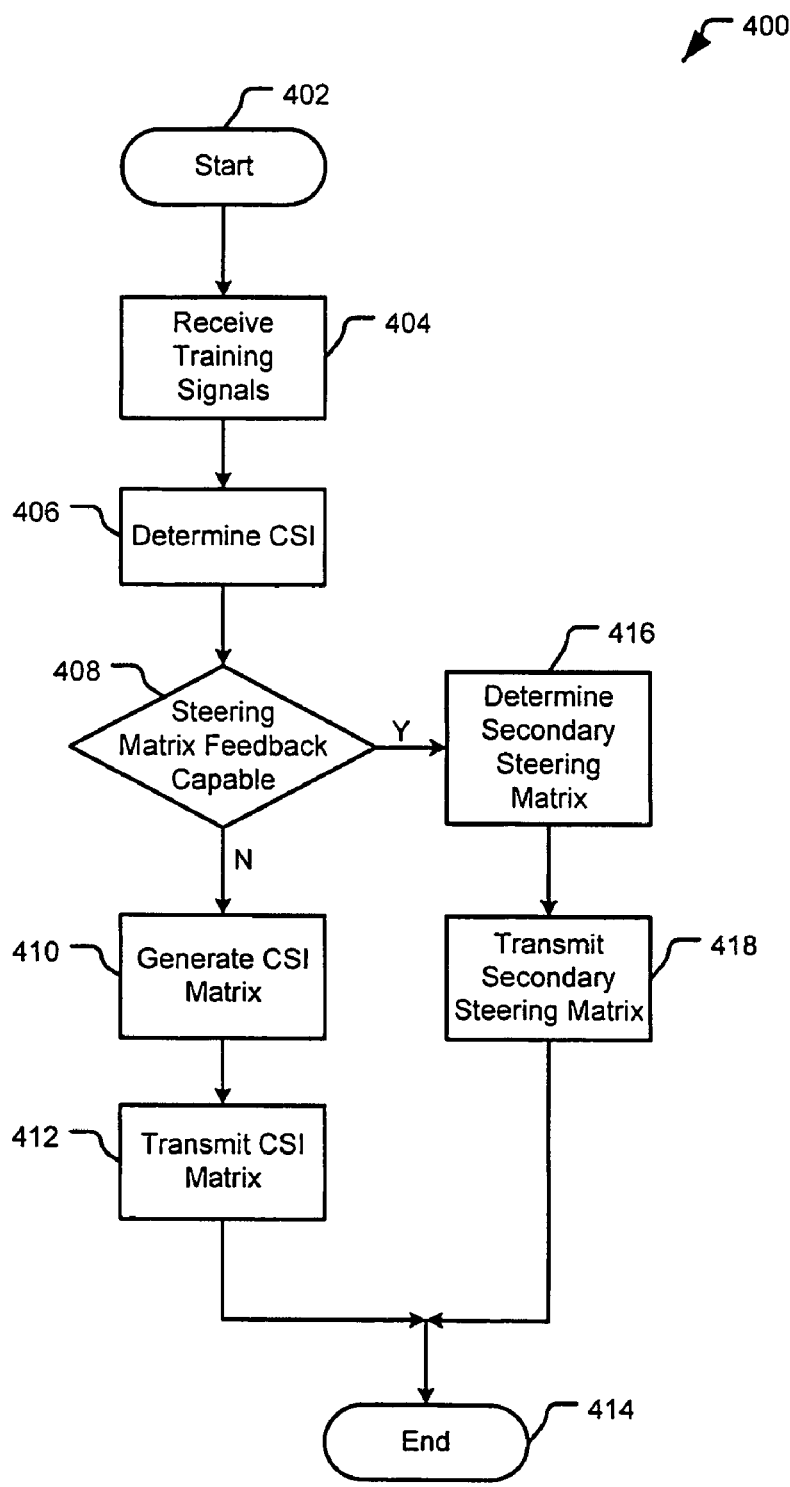
FIG. 7 is a flowchart illustrating exemplary steps that may be implemented by the primary network device in determining a steering matrix for the secondary network device.

Referring now to FIG. 7, the primary device 302 may implement steps generally identified at 400 to assist the secondary device 304 in determining a steering matrix for the secondary device 304. The process begins in step 402 when the secondary device 304 has data to transmit to the primary device 302. In step 404, the primary device 302 receives training signals from the secondary device 304. As previously mentioned, the training signals may include a management action frame that indicates whether the secondary device 304 is capable adjusting the secondary weights 320 based on a steering matrix generated by the primary device 302.

The primary calibration module 328 may determine CSI of the training signals in step 406. In step 408, the primary calibration module 328 may inspect the management information frame and determine whether the secondary device 304 is capable of receiving a steering matrix from the primary device 302 and directing the RF signals 310 toward the primary device 302 based thereon. If the secondary device 304 is not capable of receiving a steering matrix from the primary device 302, the primary calibration device 328 generates a CSI matrix in step 410. The CSI matrix may be transmitted to the secondary device 304 in step 412 and the process may end in step 414.

However, if the secondary device 304 is capable, the secondary steering module 323 of the primary device 302 may determine a steering matrix for the secondary device in step 416. In step 418, the primary calibration module 328 may transmit the steering matrix to the secondary device and the process may end in step 414.

Figure 8:
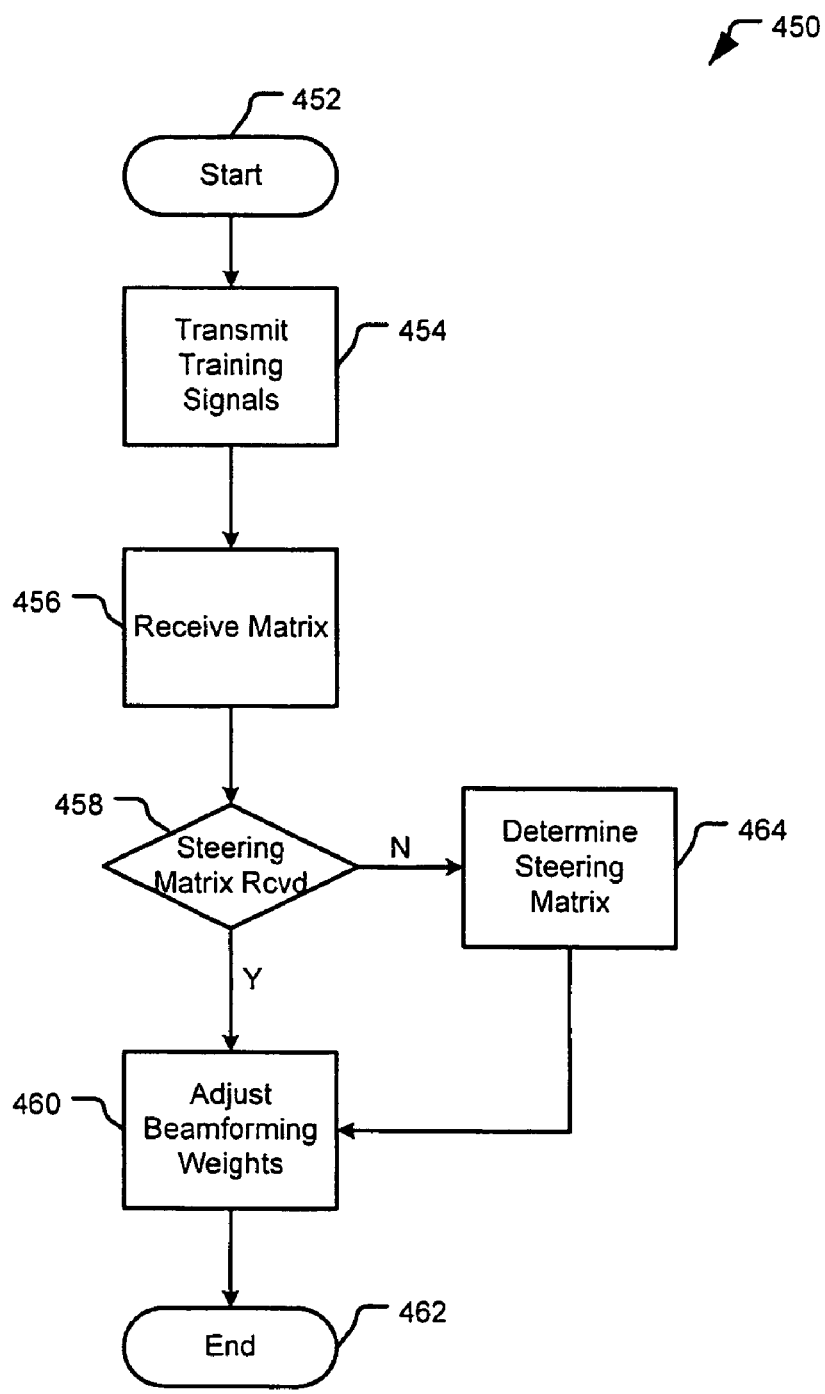
FIG. 8 is a flowchart illustrating exemplary steps that may be implemented by the secondary network device in determining a steering matrix.

Referring now to FIG. 8, the secondary device 304 may implement steps generally identified at 450 in determining a steering matrix. The process begins in step 452 when the secondary device 304 has data to transmit to the primary device 302. In step 454, the secondary device 304 transmits training signals to the primary device 302. As previously mentioned, the training signals may include a management action frame that indicates whether the secondary device 304 is capable adjusting the weights 320 based on a steering matrix generated by the primary device 302.

The secondary calibration module 334 may receive a matrix based on the training signals from the primary device 302 in step 456. In step 458, the secondary calibration module 334 may determine whether the matrix received from the primary device 302 is a steering matrix. If the matrix is a steering matrix, the secondary control module 331 may adjust the weights 320 based on the steering matrix in step 460 and the process may end in step 462.

However, if the matrix received from the primary device 302 is not a steering matrix, the secondary steering module 332 may determine a steering matrix based on the matrix received from the primary device 302 in step 464. The secondary control module 331 may then adjust the secondary weights 320 based on the steering matrix in step 460 and the process may end in step 462.

Figure 9A:
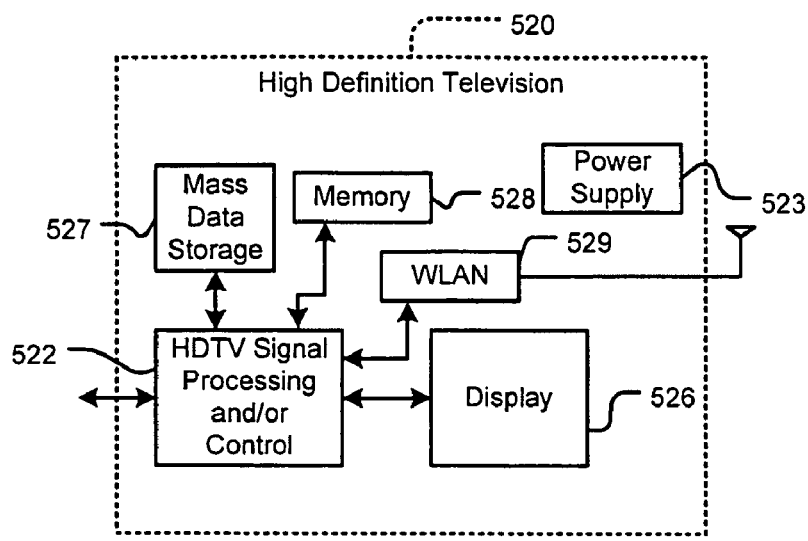
FIG. 9A is a functional block diagram of a high definition television.

Referring now to FIGS. 9A-9E, various exemplary implementations of the systems and methods of present disclosure are shown. Referring now to FIG. 9A, the systems and methods of present disclosure can be implemented in a WLAN interface 529 of a high definition television (HDTV) 520. The HDTV 520 receives HDTV input signals in either a wired or wireless format and generates HDTV output signals for a display 526. In some implementations, signal processing circuit and/or control circuit 522 and/or other circuits (not shown) of the HDTV 520 may process data, perform coding and/or encryption, perform calculations, format data and/or perform any other type of HDTV processing that may be required.

The HDTV 520 may communicate with mass data storage 527 that stores data in a nonvolatile manner such as optical and/or magnetic storage devices. The HDTV 520 may be connected to memory 528 such as RAM, ROM, low latency nonvolatile memory such as flash memory and/or other suitable electronic data storage. The HDTV 520 also may include a power supply 523.

Figure 9B:
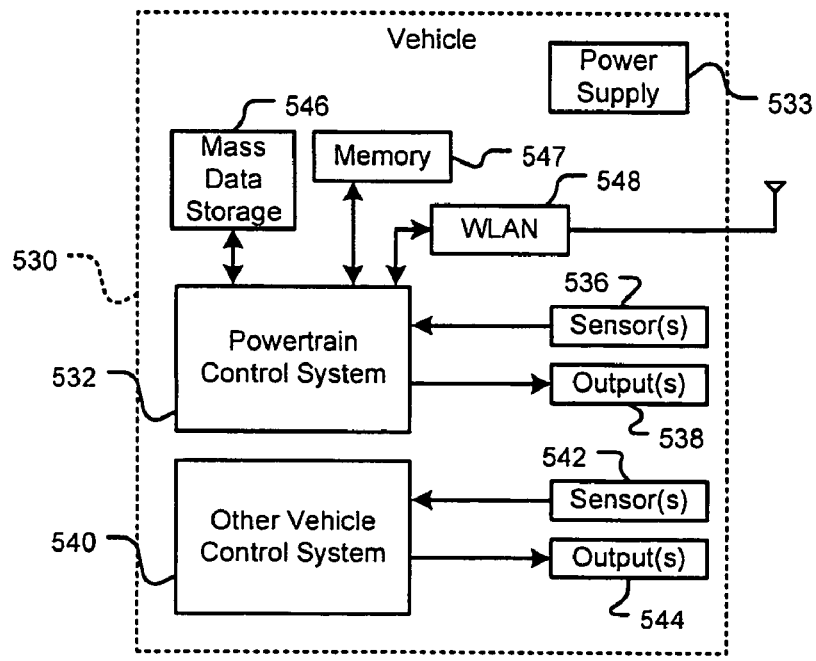
FIG. 9B is a functional block diagram of a vehicle control system.

Referring now to FIG. 9B, the systems and methods of present disclosure may be implemented in a WLAN interface 548 of a vehicle 530. A powertrain control system 532 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 540 may likewise receive signals from input sensors 542 and/or output control signals to one or more output devices 544. In some implementations, the control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 532 may communicate with mass data storage 546 that stores data in a nonvolatile manner. The mass data storage 546 may include optical and/or magnetic storage devices for example hard disk drives HDD and/or DVDs. The powertrain control system 532 may be connected to memory 547 such as RAM, ROM, low latency nonvolatile memory such as flash memory and/or other suitable electronic data storage. The powertrain control system 532 also may support connections with a WLAN via WLAN interface 548. Vehicle 530 may also include a power supply 533.

Figure 9C:
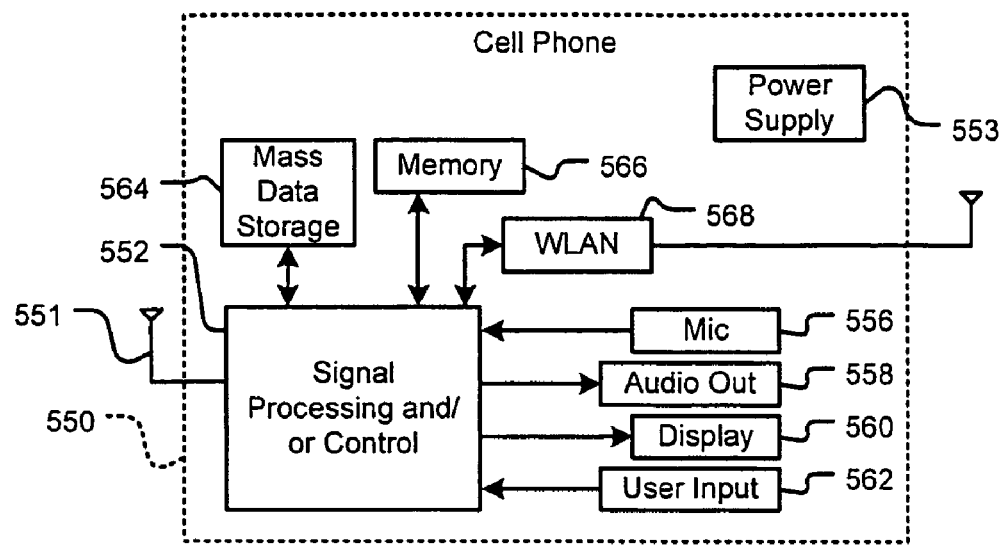
FIG. 9C is a functional block diagram of a cellular phone.

Referring now to FIG. 9C, the systems and methods of present disclosure can be implemented in a WLAN interface 568 of a cellular phone 550 that may include a cellular antenna 551. In some implementations, the cellular phone 550 includes a microphone 556, an audio output 558 such as a speaker and/or audio output jack, a display 560 and/or an input device 562 such as a keypad, pointing device, voice actuation and/or other input device. The signal processing and/or control circuits 552 and/or other circuits (not shown) in the cellular phone 550 may process data, perform coding and/or encryption, perform calculations, format data and/or perform other cellular phone functions.

The cellular phone 550 may communicate with mass data storage 564 that stores data in a nonvolatile manner such as optical and/or magnetic storage devices for example hard disk drives HDD and/or DVDs. The cellular phone 550 may be connected to memory 566 such as RAM, ROM, low latency nonvolatile memory such as flash memory and/or other suitable electronic data storage. The cellular phone 550 also may support connections with a WLAN via WLAN interface 968. Cellular phone 550 may also include a power supply 553.

Figure 9D:
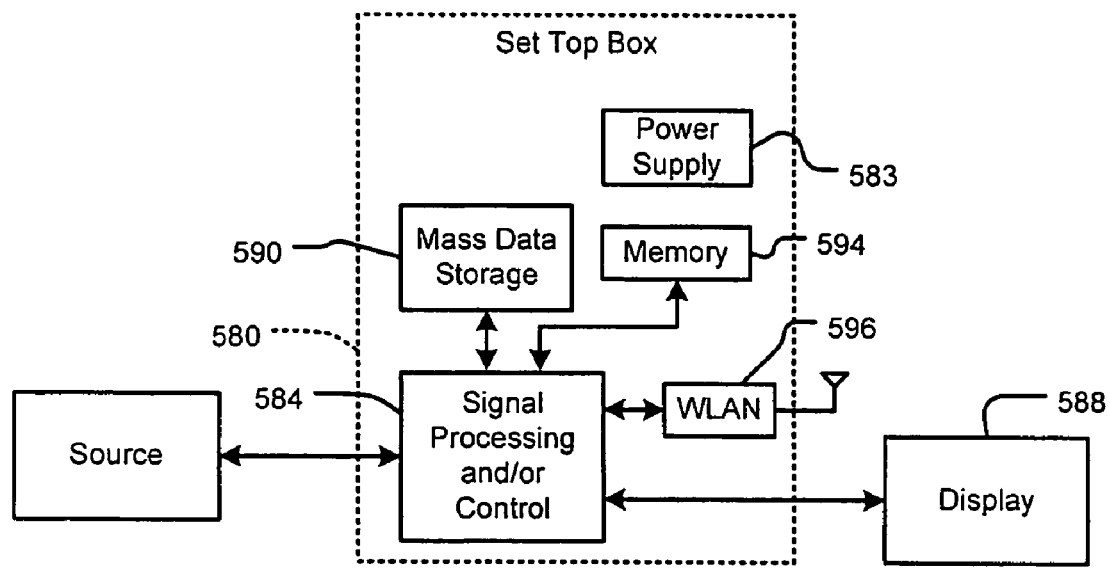
FIG. 9D is a functional block diagram of a set top box.

Referring now to FIG. 9D, the systems and methods of present disclosure can be implemented in a WLAN interface 596 of a set top box 580. The set top box 580 receives signals from a source such as a broadband source and outputs standard and/or high definition audio/video signals suitable for a display 588 such as a television and/or monitor and/or other video and/or audio output devices. The signal processing and/or control circuits 584 and/or other circuits (not shown) of the set top box 580 may process data, perform coding and/or encryption, perform calculations, format data and/or perform any other set top box function.

The set top box 580 may communicate with mass data storage 590 that stores data in a nonvolatile manner. The mass data storage 590 may include optical and/or magnetic storage devices for example hard disk drives HDD and/or DVDs. The set top box 580 may be connected to memory 594 such as RAM, ROM, low latency nonvolatile memory such as flash memory and/or other suitable electronic data storage. The set top box 580 also may support connections with a WLAN via WLAN interface 596. Set top box 580 may also include a power supply 583.

Figure 9E:
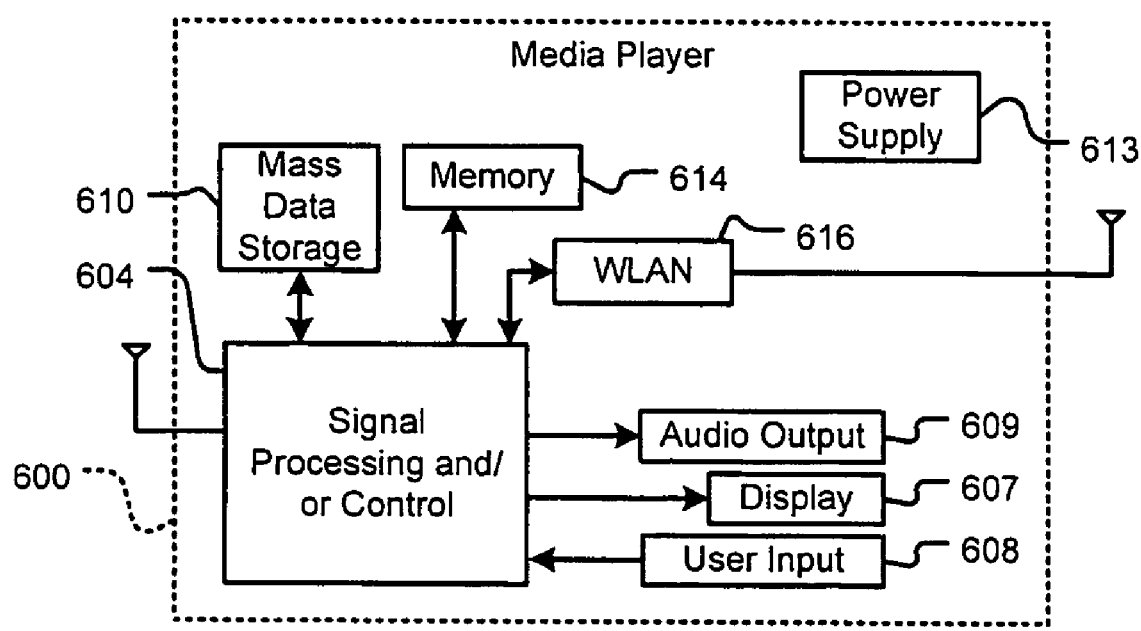
FIG. 9E is a functional block diagram of a media player.

Referring now to FIG. 9E, the systems and methods of present disclosure can be implemented in a WLAN interface 1016 of a media player 600. In some implementations, the media player 1000 includes a display 1007 and/or a user input 1008 such as a keypad, touchpad and the like. In some implementations, the media player 1000 may employ a graphical user interface (GUI) that typically employs menus, drop down menus, icons and/or a point-and-click interface via the display 1007 and/or user input 1008. The media player 1000 further includes an audio output 1009 such as a speaker and/or audio output jack. The signal processing and/or control circuits 1004 and/or other circuits (not shown) of the media player 1000 may process data, perform coding and/or encryption, perform calculations, format data and/or perform any other media player function.

The media player 1000 may communicate with mass data storage 1010 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The media player 1000 may be connected to memory 514 such as RAM, ROM, low latency nonvolatile memory such as flash memory and/or other suitable electronic data storage. The media player 1000 also may support connections with a WLAN via WLAN interface 1016. Media player 1000 may also include a power supply 1013. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A network device comprising:
   a calibration module that receives a first channel state information (CSI) matrix from a link partner, that determines CSI based on radio frequency (RF) signals transmitted from said link partner, and that generates a second CSI matrix that includes said CSI for said RF signals;
   a first steering module that determines a first steering matrix based on said first CSI matrix;

a control module that adjusts beamforming weights based on said first steering matrix; and a second steering module that determines a second steering matrix based on said second CSI matrix and that transmits said second steering matrix to said link partner in response to a determination whether said link partner is capable of adjusting beamforming weights based on steering matrix feedback.

2. The network device of claim 1 wherein said beamforming weights are adjusted to direct RF signals toward said link partner.

3. The network device of claim 1 wherein said calibration module transmits a set of training signals to said link partner.

4. The network device of claim 3 wherein said first CSI matrix is based on said training signals.

5. The network device of claim 3 wherein at least one of said training signals includes a frame that indicates whether said network device is capable of generating said second steering matrix.

6. The network device of claim 1 wherein at least one of said RF signals includes a frame that indicates whether said link partner is capable of directing said RF signals toward said network device based on said second steering matrix.

7. The network device of claim 1 further comprising:
a set of RF transceivers that transmit and receive RF signals; and
a beamforming module that directs said RF transceivers to transmit toward said link partner based on said first steering matrix.

8. An access point (AP) comprising the network device of claim 7.

9. A wireless network comprising the network device of claim 1 and further comprising said link partner, wherein said link partner comprises:
a set of RF transceivers that transmit and receive RF signals; and
a beamforming module that directs said RF transceivers to transmit toward said network device based on said second steering matrix.

10. A wireless network comprising the AP of claim 8 and further comprising said link partner, wherein said link partner comprises:
a set of RF transceivers that transmit and receive RF signals; and
a beamforming module that directs said RF transceivers to transmit toward said network device based on said second steering matrix.

11. The wireless network of claim 9 wherein said link partner further comprises a secondary calibration module that generates said first CSI matrix.

12. The wireless network of claim 9 wherein said link partner further comprises:
a secondary steering module that generates a secondary steering matrix based on said CSI; and
a secondary control module that directs said beamforming module to adjust beamforming weights, wherein said beamforming weights direct said RF signals toward said network device.

13. A network device comprising:
a calibration module that determines channel state information (CSI) based on radio frequency (RF) signals transmitted from a link partner, that generates a CSI matrix that includes said CSI for said RF signals, that transmits said CSI matrix to said link partner in response to a determination whether said link partner is capable of adjusting beamforming weights based on steering matrix feedback, and that receives a steering matrix from said link partner; and
a control module that adjusts beamforming weights based on said steering matrix.

14. The network device of claim 13 wherein said calibration module transmits a set of training signals to said link partner.

15. The network device of claim 14 wherein said steering matrix is based on said training signals.

16. The network device of claim 14 wherein at least one of said training signals includes a frame that indicates whether said network device is capable of adjusting said beamforming weights based on said steering matrix.

17. The network device of claim 13 wherein at least one of said RF signals includes a frame that indicates whether said link partner is capable of generating said steering matrix.

18. The network device of claim 13 further comprising:
a set of RF transceivers that transmit and receive RF signals; and
a beamforming module that directs said RF signals toward said link partner.

19. A wireless network comprising said network device of claim 13 and further comprising a link partner, wherein said link partner comprises:
a set of RF transceivers that transmit and receive RF signals; and
a beamforming module that directs said RF transceivers to transmit toward said network device based on said CSI matrix.

20. The wireless network of claim 19 wherein said link partner includes an access point.

21. The wireless network of claim 19 wherein said link partner further comprises:
a second calibration module that receives said CSI matrix, that determines a second CSI based on said RF signals, and that generates a second CSI matrix that includes said second CSI for each of said RF signals;
a first steering module that determines said steering matrix based on said second CSI matrix;
a second steering module that determines a second steering matrix based on said CSI matrix; and
a second control module that adjusts a second set of beamforming weights based on said second steering matrix, wherein said RF signals are directed toward said network device when said second set of weights are adjusted.

22. The network device of claim 13 further comprising a steering module that generates a second steering matrix based on a second CSI matrix received from said link partner.

23. A method, comprising:
receiving a first channel state information (CSI) matrix from a link partner;
determining CSI based on radio frequency (RF) signals transmitted from said link partner;
generating a second CSI matrix that includes said CSI for said RF signals;
determining a first steering matrix based on said first CSI matrix;
adjusting beamforming weights based on said first steering matrix;
determining a second steering matrix based on said second CSI matrix; and
transmitting said second steering matrix to said link partner in response to a determination whether said link partner is capable of adjusting beamforming weights based on steering matrix feedback.

24. The method of claim 23 further comprising adjusting said beamforming weights to direct RF signals toward said link partner.

25. The method of claim 23 further comprising transmitting a set of training signals to said link partner.

26. The method of claim 25 further comprising generating said first CSI matrix based on said training signals.

27. The method of claim 25 further comprising including a frame in at least one of said training signals to indicate ability to generate said second steering matrix.

28. The method of claim 23 further comprising including a frame in at least one of said RF signals to indicate whether said link partner can direct said RF signals based on said second steering matrix.

29. The method of claim 23 further comprising:
transmitting and receiving RF signals; and
directing transmission and reception of said RF signals toward said link partner based on said first steering matrix.

30. The method of claim 23 further comprising:
transmitting and receiving RF signals at said link partner; and
directing transmission and reception of said RF signals at said link partner based on said second steering matrix.

31. The method of claim 30 further comprising generating said first CSI matrix.

32. The method of claim 30 further comprising:
generating a secondary steering matrix based on said CSI; and
adjusting beamforming weights, wherein said beamforming weights direct said RF signals.

33. A method, comprising:
determining channel state information (CSI) based on radio frequency (RF) signals transmitted from a link partner;
generating a CSI matrix that includes said CSI for said RF signals;
transmitting said CSI matrix to said link partner in response to a determination whether said link partner is capable of adjusting beamforming weights based on steering matrix feedback;
receiving a steering matrix from said link partner; and
adjusting beamforming weights based on said steering matrix.

34. The method of claim 33 further comprising transmitting a set of training signals to said link partner.

35. The method of claim 34 further comprising generating said steering matrix based on said training signals.

36. The method of claim 34 further comprising including a frame in at least one of said training signals to indicate ability to adjust beamforming weights based on said steering matrix.

37. The method of claim 33 further comprising including a frame in at least one of said RF signals to indicate whether said link partner can generate said steering matrix.

38. The method of claim 33 further comprising:
transmitting and receiving RF signals; and
directing transmission and reception of said RF signals toward said link partner.

39. The method of claim 33 further comprising:
transmitting and receiving RF signals at said link partner; and
directing transmission and reception of said RF signals at said link partner based on said CSI matrix.

40. The method of claim 39 further comprising:
receiving said CSI matrix;
determining a second CSI based on said RF signals;
generating a second CSI matrix that includes said second CSI for each of said RF signals;
determining said steering matrix based on said second CSI matrix;
determining a second steering matrix based on said CSI matrix;
adjusting a second set of beamforming weights based on said second steering matrix; and
directing said RF signals when said second set of weights are adjusted.

41. The method of claim 33 further comprising generating a second steering matrix based on a second CSI matrix received from said link partner.

* * * * *

UNITED STATES PATENT AND TRADEMARK OFFICE
CERTIFICATE OF CORRECTION

PATENT NO. : 7,570,210 B1  Page 1 of 1
APPLICATION NO. : 11/481142
DATED : August 4, 2009
INVENTOR(S) : Rohit Nabar et al.

It is certified that error appears in the above-identified patent and that said Letters Patent is hereby corrected as shown below:

| | |
|---|---|
| Column 4, Line 4 | Delete "that" after "comprises" |
| Column 6, Line 18 | Delete second occurrence of "In another feature" |
| Column 6, Line 41 | Delete "that" after "comprises" |
| Column 7, Line 14 | Delete "function" and insert -- functional -- |
| Column 8, Line 6 | Delete second occurrence of "device" after "102" |
| Column 10, Line 10 | Insert -- be -- after "may" |
| Column 10, Line 67 | Delete "396" and insert -- 326s -- |
| Column 12, Line 18 | Insert -- of -- after "capable" |
| Column 12, Line 46 | Insert -- of -- after "capable" |

Signed and Sealed this

Twenty-second Day of September, 2009

David J. Kappos
*Director of the United States Patent and Trademark Office*